(12) United States Patent
Houde-Walter (10) Patent No.: US 6,366,349 B1
(45) Date of Patent: Apr. 2, 2002

(54) APPARATUS FOR ALIGNING OPTICAL ELEMENTS IN RESPONSE TO THE DISPLAY OF A REFLECTED RETICLE IMAGE AND METHOD OF ALIGNING

(75) Inventor: William R. Houde-Walter, Rush, NY (US)

(73) Assignee: LaserMax, Inc., Rochester, NY (US)

( * ) Notice: Subject to any disclaimer, the term of this patent is extended or adjusted under 35 U.S.C. 154(b) by 0 days.

(21) Appl. No.: 09/499,219

(22) Filed: Feb. 7, 2000

Related U.S. Application Data (63) Continuation-in-part of application No. 09/080,500, filed on May 18, 1998, now Pat. No. 6,025,908.

(51) Int. Cl.$^7$ .............................................. G01B 11/26
(52) U.S. Cl. ..................................................... 356/153
(58) Field of Search .................................. 356/389–401, 356/141, 152, 153, 154, 138, 354; 359/15, 419, 435, 432, 503, 565, 827

(56) References Cited

U.S. PATENT DOCUMENTS

| | | | |
|---|---|---|---|
| 8,911 A | 4/1852 | Murrow | |
| 2,784,641 A | 3/1957 | Keuffel et al. | 356/247 |
| 3,554,630 A | 1/1971 | Rogers | 359/419 |
| 3,752,587 A | * 8/1973 | Myers et al. | 356/152 |
| 4,415,225 A | 11/1983 | Benton et al. | 359/31 |
| 4,422,758 A | * 12/1983 | Godfrey et al. | 356/152 |
| 4,448,500 A | 5/1984 | Marling et al. | 359/503 |
| 4,632,547 A | * 12/1986 | Kaplan et al. | 356/247 |
| 4,653,911 A | * 3/1987 | Fortin | 356/153 |
| 4,756,733 A | 7/1988 | Houde-Walter et al. | 65/30.13 |
| 4,930,883 A | 6/1990 | Salzman | 359/419 |
| 4,934,086 A | 6/1990 | Houde-Walter | 42/115 |
| 4,950,063 A | 8/1990 | Pohle et al. | 359/430 |

(List continued on next page.)

OTHER PUBLICATIONS

Laser Focus World, Lasemax, Dec. 15, 1996, Rochester, New York.
Astronomy, Marketplace, Jul. 17, 1997, p. 94, Johnstown, Colorado.
Bouchra Lahnin, Oct. 2, 1997 10:34 PM,US and EP Search Results 01.17.
Bouchra Lahnin, Oct. 2, 1997 10:34 PM,US and EP Search Results 02/17.
Bouchra Lahnin, Oct. 2, 1997 10:34 PM,US and EP Search Results 03/17.
Bouchra Lahnin, Oct. 2, 1997 10:34 PM,US and EP Search Results 04/17
Bouchra Lahnin, Oct. 2, 1997 10:34 PM,US and EP Search Results 05/17.
Bouchra Lahnin, Oct. 2, 1997 10:34 PM,US and EP Search Results 06/17.
Bouchra Lahnin, Oct. 2, 1997 10:34 PM,US and EP Search Results 07/17.
Bouchra Lahnin, Oct. 2, 1977 10:34 PM,US and EP Search Results 08/17.
Bouchra Lahnin, Oct. 2, 1997 10:34 PM,US and EP Search Results 09/17.
Bouchra Lahnin, Oct. 2, 1997 10:34 PM,US and EP Search Results 10/17.

(List continued on next page.)

Primary Examiner—Frank G. Font
Assistant Examiner—Michael P. Stafira
(74) Attorney, Agent, or Firm—Brian B. Shaw, Esq.; Stephen B. Salai, Esq.; Harter, Secrest & Emery LLP (57) ABSTRACT

The present invention includes a reticle image generator and a display screen selected to form a reflected reticle image from the optical element to be aligned, wherein the reflected reticle image is viewed on the display screen. The optical element is then aligned in response to the reflected reticle image upon the display screen.

10 Claims, 13 Drawing Sheets

U.S. PATENT DOCUMENTS

| | | | |
|---|---|---|---|
| 5,009,502 A | 4/1991 | Shih et al. | 356/152.1 |
| 5,121,220 A | 6/1992 | Nakamoto | 359/419 |
| 5,317,570 A | 5/1994 | Morris et al. | 370/234 |
| 5,329,347 A | 7/1994 | Wallace et al. | 356/4.01 |
| 5,386,257 A | 1/1995 | Swartwood | 352/198 |
| 5,433,446 A | 7/1995 | Lindstedt, Jr. | 473/242 |
| 5,444,569 A | 8/1995 | Broome | 359/435 |
| 5,500,524 A | 3/1996 | Rando | 250/216 |
| 5,506,702 A | 4/1996 | Simpson | 359/15 |
| 5,508,844 A | 4/1996 | Blake, Sr. | 359/503 |
| 5,509,226 A | 4/1996 | Houde-Walter | 42/117 |
| 5,530,547 A | 6/1996 | Arnold | 356/458 |
| 5,543,916 A | 8/1996 | Kachanov | 356/451 |
| 5,543,963 A | 8/1996 | Freedenberg et al. | 359/432 |
| 5,617,444 A | 4/1997 | Houde-Walter | 372/77 |
| 5,687,034 A | 11/1997 | Palmer | 359/827 |
| 5,718,496 A | 2/1998 | Feldman et al. | 353/42 |

OTHER PUBLICATIONS

Bouchra Lahnin, Oct. 2, 1997 10:34 PM,US and EP Search Results 11/17.

Bouchra Lahnin, Oct. 2, 1997 10:34 PM,US and EP Search Results 12/17.

Bouchra Lahnin, Oct. 2, 1997 10:34 PM,US and EP Search Results 13/17.

Bouchra Lahnin, Oct. 2, 1997 10:34 PM,US and EP Search Results 14/17.

Bouchra Lahnin, Oct. 2, 1997 10:34 PM,US and EP Search Results 15/17.

Bouchra Lahnin, Oct. 2, 1997 10:34 PM,US and EP Search Results 16/17.

Bouchra Lahnin, Oct. 2, 1997 10:34 PM,US and EP Search Results 17/17.

Nanotrack, at least as early as Jun. 1, 1998, Rochester, New York.

Diode Lasers, at least as early as Jun. 1, 1998, Rochester, New York.

Totally Internal. Nothing External, at least as early as Jun. 1, 1998, Rochester, New York.

Ready When You Are, at least as early as Jun. 1, 1998, Rochester, New York.

Nato Approved and Sight Unseen, at least as early as Jun. 1, 1998, Rochester, New York.

* cited by examiner

APPARATUS FOR ALIGNING OPTICAL ELEMENTS IN RESPONSE TO THE DISPLAY OF A REFLECTED RETICLE IMAGE AND METHOD OF ALIGNING

This is a continuation-in-part of application U.S. application No. 09/080,500 filed May 18, 1998 now U.S. Pat. No. 6,025,908 and entitled Alignment Of Optical Elements In Telescopes Using A Laser Beam With A Holographic Projection Reticle, herein incorporated by reference.

FIELD OF INVENTION

The present invention relates to the alignment of optical elements, and more specifically to the alignment of optical elements using a laser beam and a diffractive optic to form a projected reticle image, wherein the optical element is aligned in response to a reflected reticle image displayed upon a screen.

BACKGROUND OF THE INVENTION

Many telescopes rely upon a mirror or a mirror system to capture and reflect a desired image. However, for telescopes to operate properly, the mirrors must be properly aligned. The alignment of the mirrors in a telescope can be a very cumbersome and time consuming process. Many different methods have been utilized to align the mirrors so that a primary mirror would be aligned with a secondary mirror. For example, a prior method requires use of a specialized eye piece with crosshairs and apertures to align the telescope. In order to use these optical alignment devices, the large primary mirror must be removed. The center of the primary mirror is then located and a black dot is placed in the center of the mirror. Such removal of the mirror subjects the primary mirror to potential damage, such as scratching or breakage.

An alternative method of aligning the optical elements in a telescope is to use a known star and align the telescope in total darkness. However, this method wastes valuable observation time. Further, the accuracy of the alignment is limited to the image of the star, and the image of the star is substantially degraded by passage of the light through the atmosphere.

Newtonian type telescopes are subject to misalignment of the optical elements by shifting due to repositioning of the telescope or by transporting the telescope. A misaligned Newtonian telescope will exhibit an image of a star that looks like a comet with a tail. The misaligned telescope is not efficient in the collection of light as a light bundle is not centered on the mirror.

Lasers have been used for several years for aligning the mirrors in a telescope. In a properly aligned or collimated telescope, a laser beam is projected through an emission aperture to reflect off the secondary mirror which directs it to the center of the primary mirror. The primary mirror reflects the beam back to the secondary mirror which then reflects it back to the emission aperture of the laser. The complete return of the laser through the emission aperture assures that the telescope is correctly aligned. However, in order to accurately use a laser in aligning a telescope, the telescope must be modified for the use of a laser. The primary mirror is removed and marked with a small white circle circumscribing the center of the mirror. The white circle provides a sighting target in the alignment process to confirm that the laser beam is placed in the center of the mirror. The laser is then aligned with the white circle. Once again, the disruption of the telescope is required and subjects the mirror to possible harm.

Some telescope designs employ a cored primary mirror. A cored primary mirror includes a hole in the center of the mirror. This hole precludes any of the previous alignment methods that rely upon dots, circles or markings at the center of the primary mirror. A telescope having a cored primary mirror must be aligned by the stars, and thus suffers from the accompanying problems.

Therefore, a need exists for aligning optical elements wherein the optical elements can remain in place during the alignment operation. A further need exists for the alignment of optical elements wherein a reflected reticle image from the optical elements is displayed and the alignment can be made in response to the displayed image.

The need also exists for the alignment of optical elements in a telescope without requiring extensive downtime of the telescope. A further need exists for the alignment of the optical elements in a telescope without exposing the optical elements to potential damage, such as scratches or breakage. A still further need exists for aligning the optical elements in a telescope in a simple, inexpensive manner in which most people can perform in a relatively short period of time.

SUMMARY OF THE INVENTION

The present invention provides for the alignment of optical elements in response to the projection of a reticle image and a display of a reflected reticle image upon a screen. Thus, a reflected reticle image is displayed upon a viewing screen and the optical elements are aligned in response to the displayed reflected image on the viewing screen.

In one configuration of the system, a reticle image generator is optically intermediate a display screen and the optical elements to be aligned. An application of this configuration for a telescope locates the reticle image generator in an eyepiece tube. The display screen is proximal to the operator. The generated reticle image is projected upon the optical elements and a reflected reticle image intersects the display screen for viewing by the operator.

In alternative constructions, the reflected reticle image may be electronically captured and formed on a display screen. Thus, the display screen may be electrically powered such as a CRT, LED or LCD.

The present method contemplates creating a reticle image, projecting the reticle image on the optics to be aligned, forming a reflection of the reticle image from the optics, displaying the reflected reticle image on a display and aligning the optics in response to the reflected displayed image.

DETAILED DESCRIPTION OF THE PREFERRED EMBODIMENTS

Figure 1:
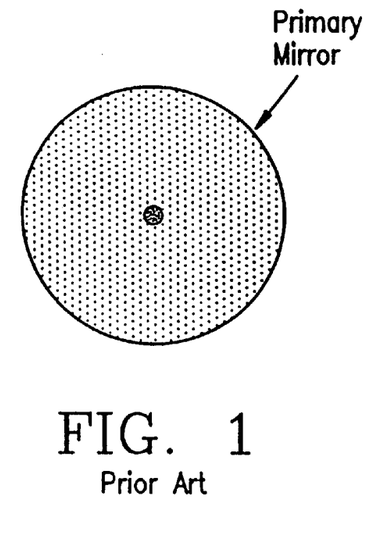
FIG. 1 is a top plan view of a primary mirror having the optical center marked with a black dot as employed in the prior art.
Figure 2:
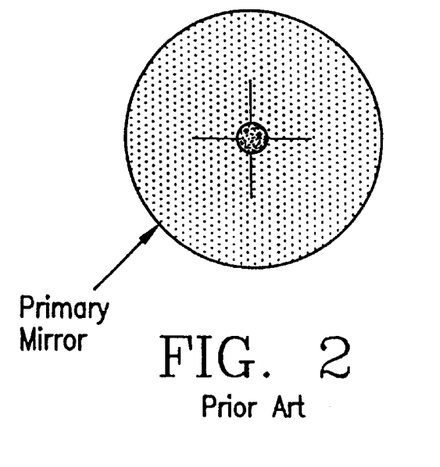
FIG. 2 is a view through the eyepiece in a first prior art method of aligning the optical elements in a telescope.

Referring to FIG. 1, a standard marking element in a prior method for aligning the optical elements is shown. In this prior method, the primary mirror is removed, the center of the primary mirror is located and a black dot is placed in the center of the mirror. Referring to FIG. 2, after the marked primary mirror is reinstalled with the marked black dot, the eyepiece is used to align with the black dot.

Figure 3:
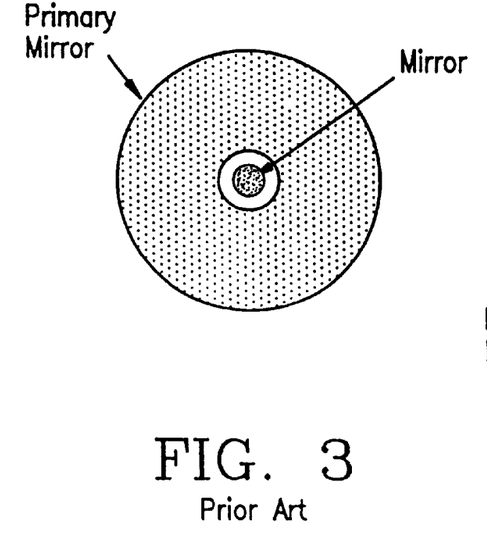
FIG. 3 is a top plan view of a primary mirror having the optical center marked with a white circle as employed in the prior art.
Figure 4:
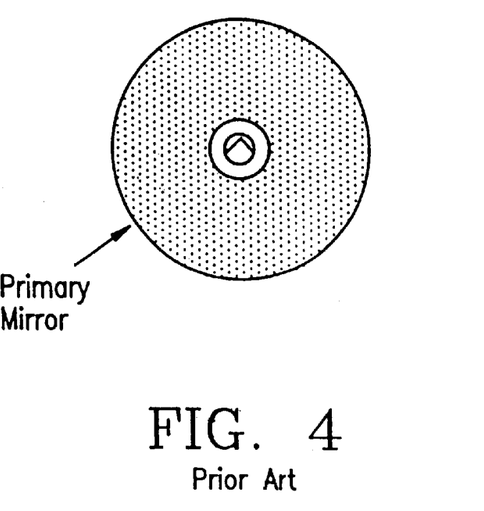
FIG. 4 is a top plan view of the primary mirror of FIG. 3 with a projected laser beam aligned with the applied white circle.

As shown in FIG. 3, in an alternative prior method, the primary mirror is removed, the center of the mirror is located and marked with a small white circle to locate the center of the mirror. Referring to FIG. 4, a projected laser spot is in the middle of the white circle, thereby providing a sighting target in the alignment process.

Figure 5:
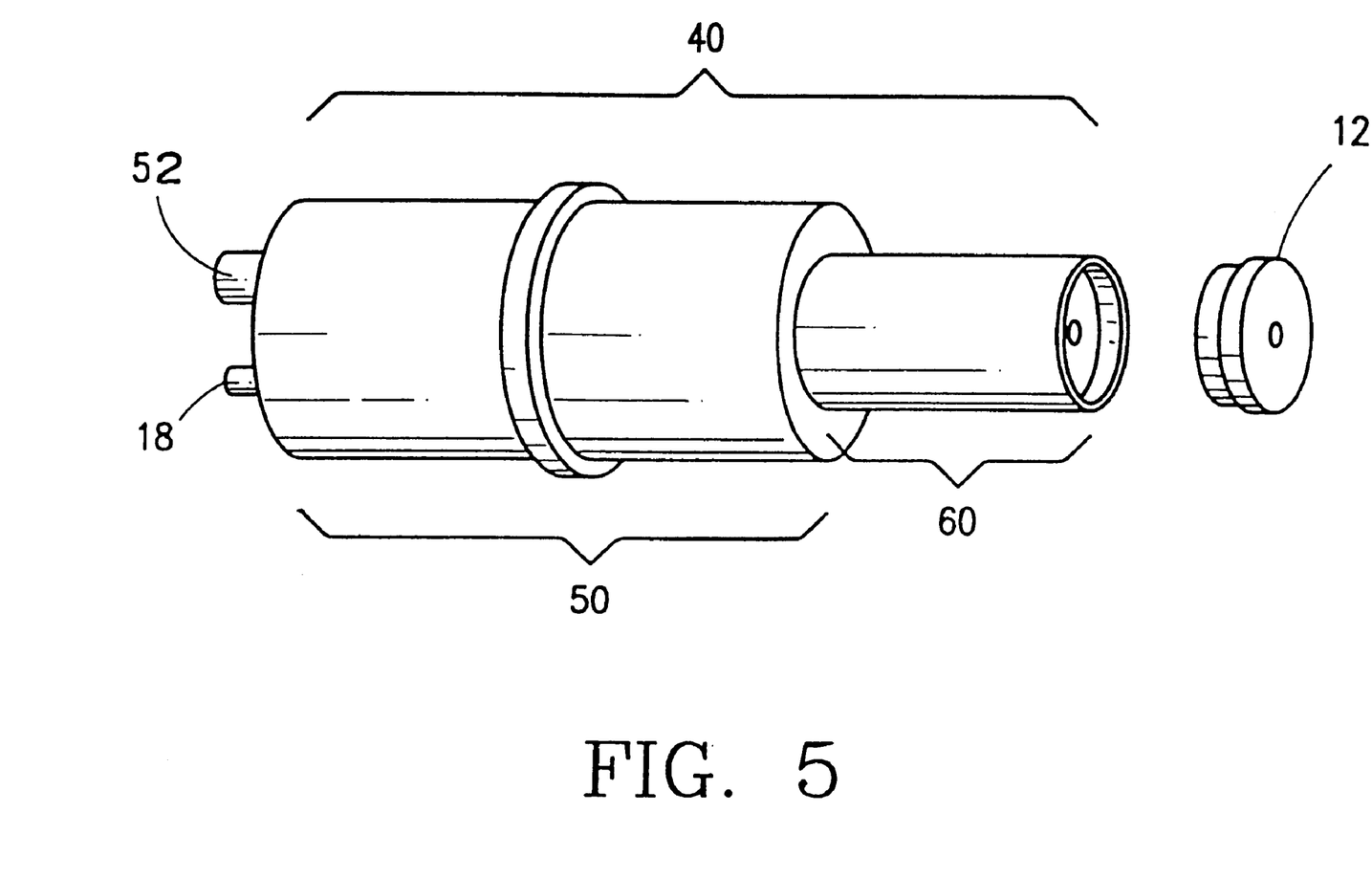
FIG. 5 is a perspective view of a laser collimator showing a hologram plate spaced from operable engagement with a housing.

Referring to FIG. 5, the present invention includes a laser collimator. The laser collimator 10 includes a housing 40 and a diffractive optic such as a hologram plate 12. The housing 40 includes a primary barrel 50 and a secondary barrel 60, wherein the primary barrel has a first diameter and the secondary barrel has a second smaller diameter. The housing 40 is preferably comprised of aircraft grade aluminum; however, other suitable materials such as stainless steel or plastic may be used. In the construction of the housing with aircraft grade aluminum, the reticle image generator 10 and its optics and alignment can withstand an impact of 2000 G.

The primary barrel 50 is sized to accommodate a laser generator 52 and control components. The laser generator 52 may be any of a variety of lasers generators including a battery powered diode laser, such as a 5 mW 635 nm laser. The brightest laser available in its FDA regulated safety class is preferably employed. Thus, the laser generator 52 provides a low level of diffuse red laser illumination for inspection of the optical path in daylight or total darkness of the telescope. Alternatively, a high brightness green laser may be employed. For example, a commercially available high brightness green laser system, is the TLC™-203N, available from LaserMax, and may be employed in the alignment of very large and multiple mirror telescopes. Further, the laser beam may have an elliptic cross section perpendicular to the optical path of the beam. In addition, the laser generator 52 is a non scanning laser, and thereby reduces the cost of the apparatus. Further, although coherent light is preferred, it is understood that incoherent light may be employed.

The control components include a power or on/off switch 19. An emission indicator 18 may also be employed to indicate functioning of the device.

The secondary barrel 60 is sized to fit within most common telescope eyepiece openings and, preferably a Newtonian telescope. In a preferred configuration, the primary barrel 50 has an approximate 2 inch diameter and a length of at least 0.5 inches. The secondary barrel 60 has a diameter of approximately 1.25 inches and an approximate length of 0.5 inches. Thus, the laser collimator 10 fits standard 1.25 inch and 2 inch focus mechanisms. However, the housing 40 or the secondary barrel 60 may be sized to a 0.925 inch outer diameter to accommodate another common telescope eyepiece holder size. It is further understood the housing 40 may be formed to a single diameter along its length, the diameter being substantially less than an eyepiece holder. That is, as shown in FIGS. 17 and 20–24, the laser generator 52 and diffractive optic are configured as a reticle image generator and disposed within a housing having a diameter that is less than one half the diameter of the eyepiece tube.

The secondary barrel 60 is constructed to retain the diffractive optic such as a hologram plate 12. Preferably, the hologram plate 12 is retained in the secondary barrel 60 by a threaded connection. The secondary barrel 60 preferably has standard 1.25×32 inside threads. The hologram plate preferably includes compatible threads. Thus, the outer surface of the secondary barrel 60 is free of projections which could interfere with the corresponding eyepiece structure of the telescope.

The hologram plate 12 includes a holographic diffractive reticle image 30. The reticle image 30 may be formed on the plate by a variety of methods. The reticle may be imprinted on the lens, positioned between two layers of the lens, or attached to the lens of the reticle image generator 10 by any standard technique or process. For example, the desired reticle pattern may be attached to the housing by cooperating threaded engagement. Alternatively, the lens may be integrally connected to the housing 40.

Preferably, the housing 40 and hologram plate 12 are configured to pass the diffractive image through a predetermined aperture. This aperture is identified as a laser aperture. The reticle image 30 thus passes from the hologram plate 12 via a laser aperture. Preferably, the hologram plate 12 and laser aperture are selected to be centered with respect to the secondary barrel 60 and hence the eyepiece of the telescope.

Figure 6:
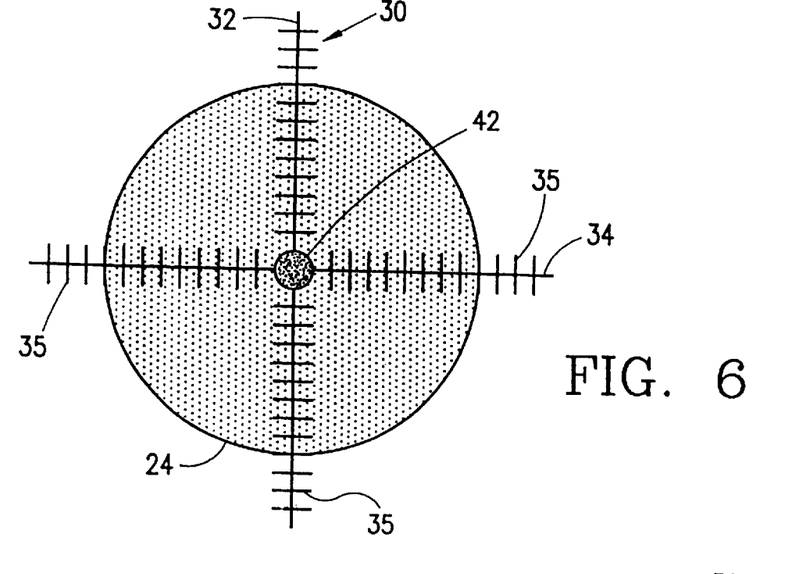
FIG. 6 is first configuration of the reconstructed reticle image projected on a primary mirror.
Figure 7:
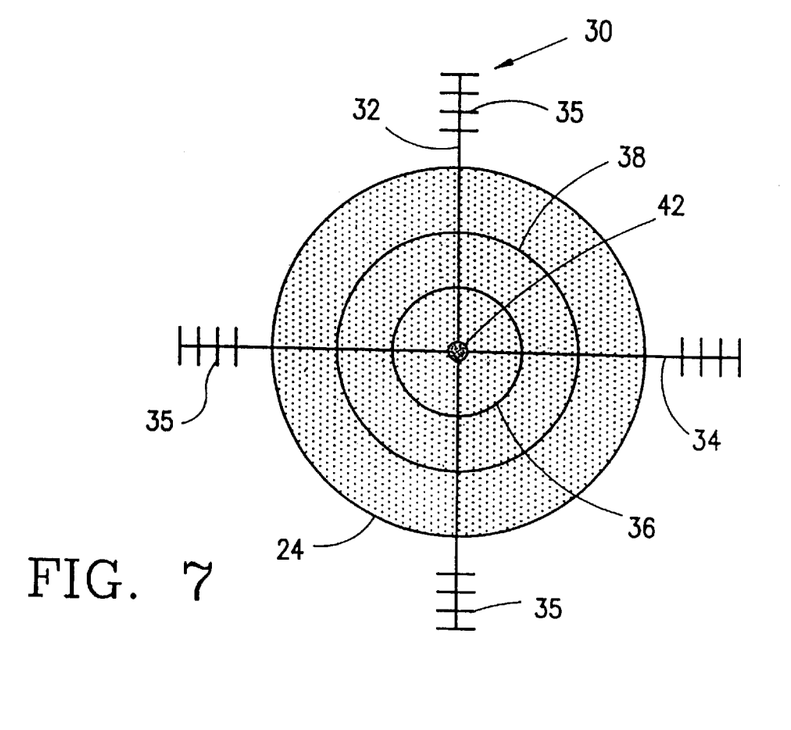
FIG. 7 is second configuration of the reconstructed reticle projected on a primary mirror.
Figures 8, 9, 10, 11:
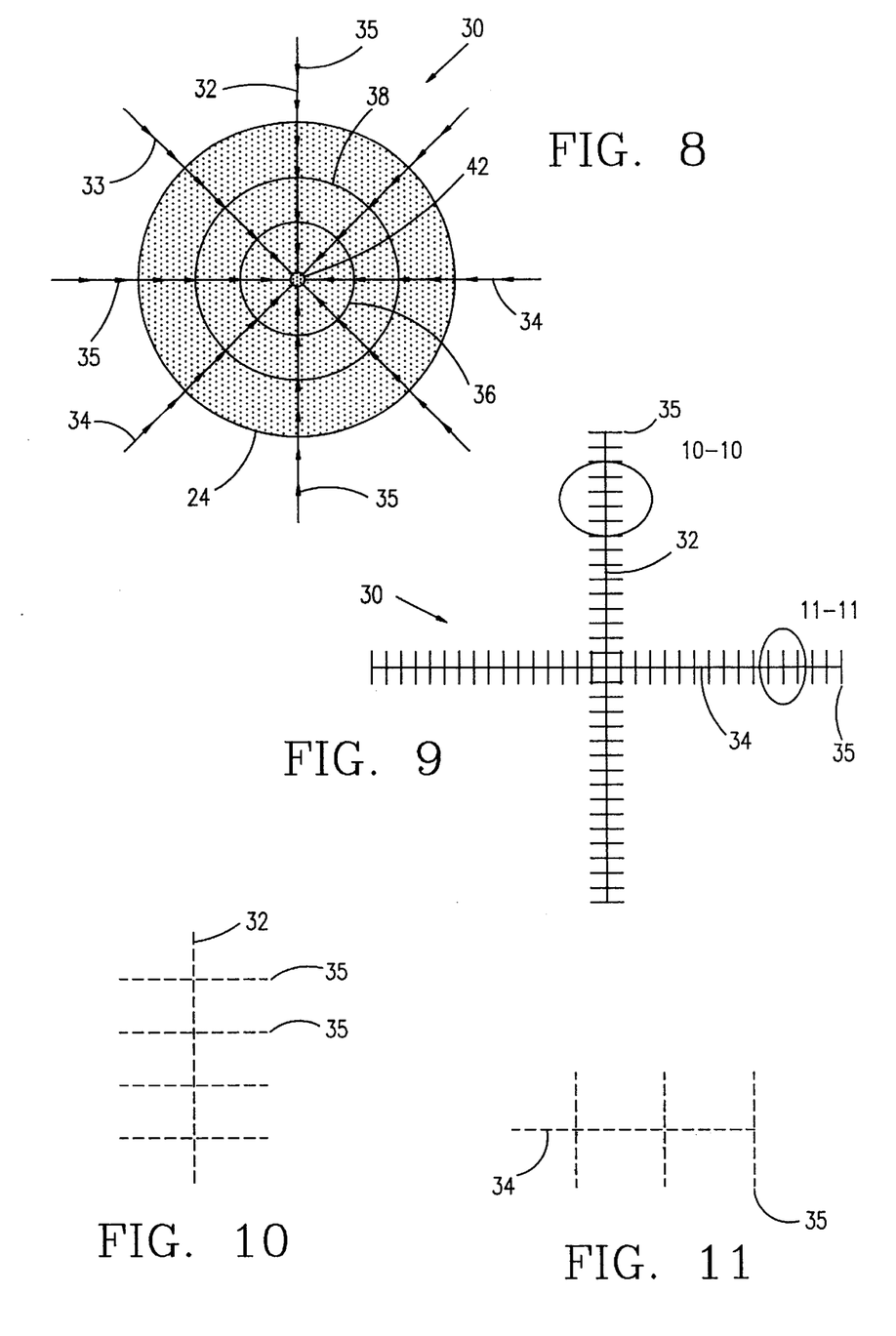
FIG. 8 is a third configuration of the reconstructed reticle projected on a primary mirror.
FIG. 9 is a projected reticle image.
FIG. 10 is an enlarged view of a gradation portion of the reticle image of FIG. 8, as encompassed by line 10—10 in FIG. 8.
FIG. 11 is an enlarged view of a gradation portion of the reticle image of FIG. 8, as encompassed by line 11—11 in FIG. 8.

The reticle image 30 as shown in FIGS. 6, 7 and 8 combines several images including a crosshair formed of linear segments 32, 34 with gradations 35, an inner ring 36 for centering the image, and a bright central spot 42. Preferably, the linear segments 32, 34 are perpendicular to each other and the gradations 35 intersect a given linear segment 32, 34 and are perpendicular to the respective linear segment. The linear segments are pixelated along the length of the linear segment. Thus, the resolution is provided by the linear segments rather than the gradations 35. The gradations 35 are used to identify a particular number or occurrence of pixelations along the linear segment 32, 34. In a preferred embodiment, the linear segments 32, 34 include a base ten pixelation along the length of the respective segment. The bright central spot 42 is formed at the intersection of the linear segments 32, 34. The inner ring 36 is preferably concentric with the intersection of the linear segments 32, 34, and is further centered with respect to the gradations 35. An outer ring 38 may be employed in the reticle image 30. Preferably, the outer circle 38 is concentric with the inner circle and lines within a radius defined by the gradations 35. Further, the gradations 35 may be of a repeat to provide ready recognition of a series or groups of gradations. For example every other, every third or every fourth or more gradation may be a different size than an adjacent gradation. In addition, the gradations may be of varied spacing and need not be precisely spaced apart. In another preferred embodiment shown in FIG. 8, the reticle image includes the inner ring 36, outer ring 38 and crosshairs which comprise linear segments 31, 32, 33 and 34, all of which intersect at the center, which have equal angular separations of 45°, and which further have gradations 35 which comprise arrows pointing to the center, to provide directional guidance for the alignment process. The important aspect is the gradations are equal about opposite sides of the intersection of the linear segments 32, 34. Further, as shown in FIG. 10, the gradations 35 may be formed of a multitude of smaller line segments.

Although a hologram has been described in detail, it is possible to form the reticle by a photographic plate or layer. The photographic layer has the reticle pattern formed therein and upon passage of a light through the photographic plate; the reticle image 30 is formed and projected along the optical path. Thus, the diffractive optic is disposed in the optical path of the reticle image generator 10 to form the reticle image 30.

Preferably, the reticle image 30 is sized to dispose at least a portion of the reticle image 30 beyond the periphery of the optical element to be aligned. The size of the reticle image 30 is determined in part by the size of the telescope barrel as well as the optical elements to be aligned.

Figure 12:
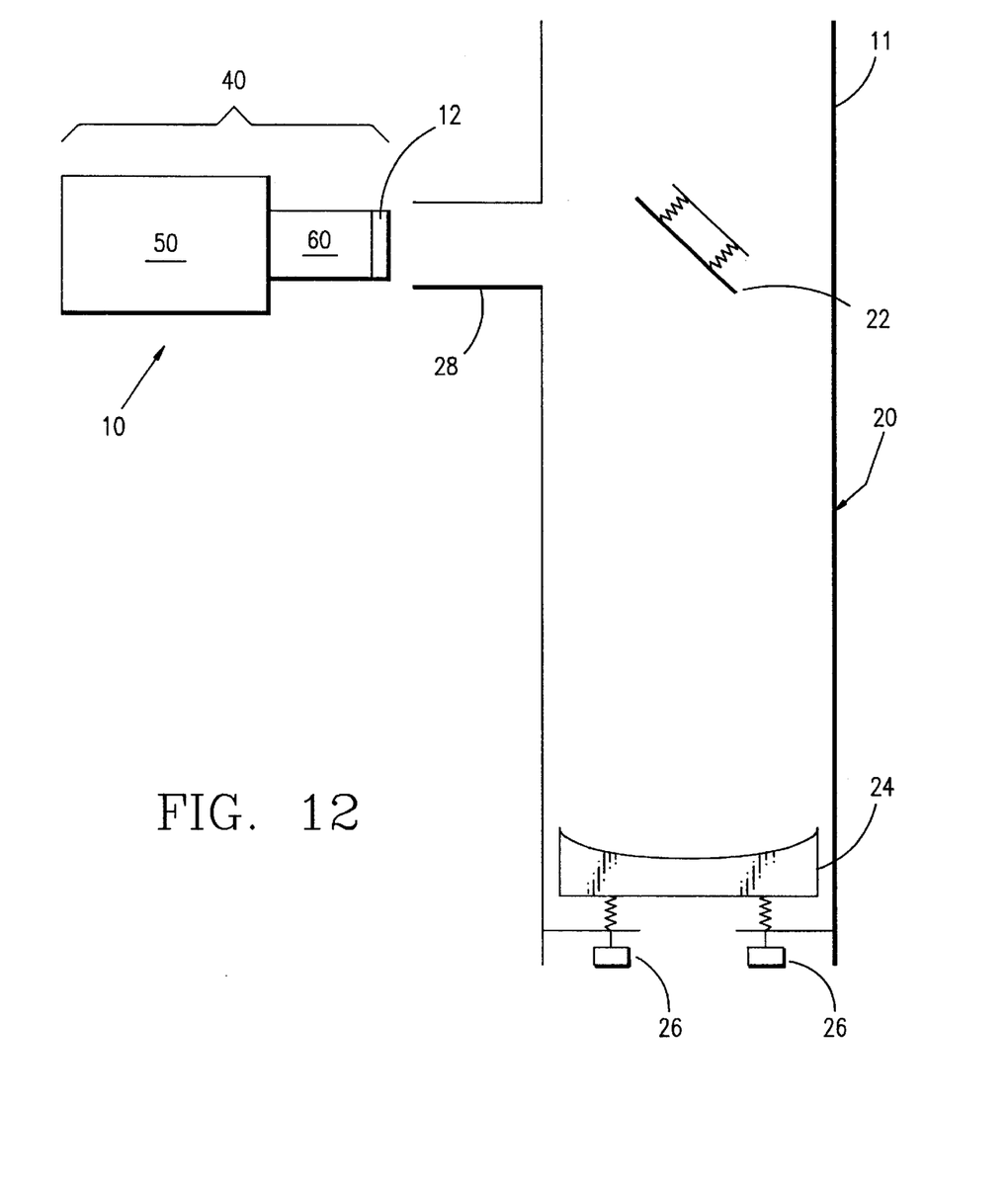
FIG. 12 is a side elevational view of the laser collimator operably disposed in a telescope to align the optical elements.
Figure 13:
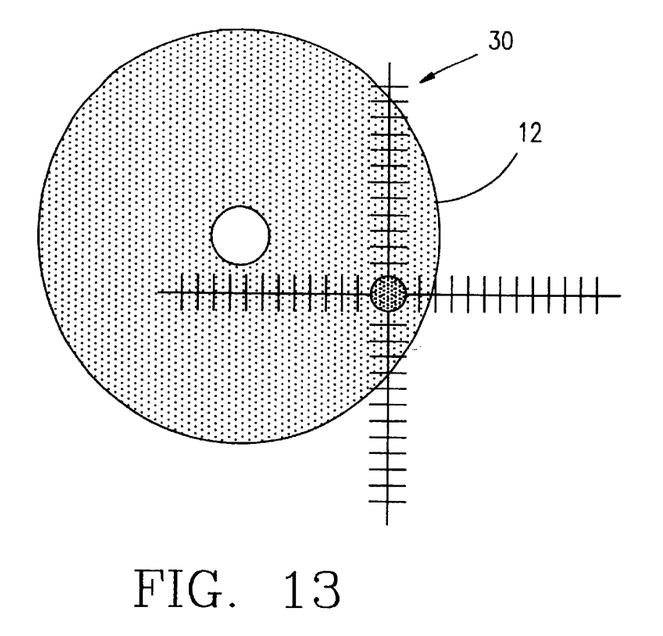
FIG. 13 is plan view of a reconstructed reticle projected on an eyepiece aperture of a hologram plate, wherein the reticle is misaligned.
Figure 14:
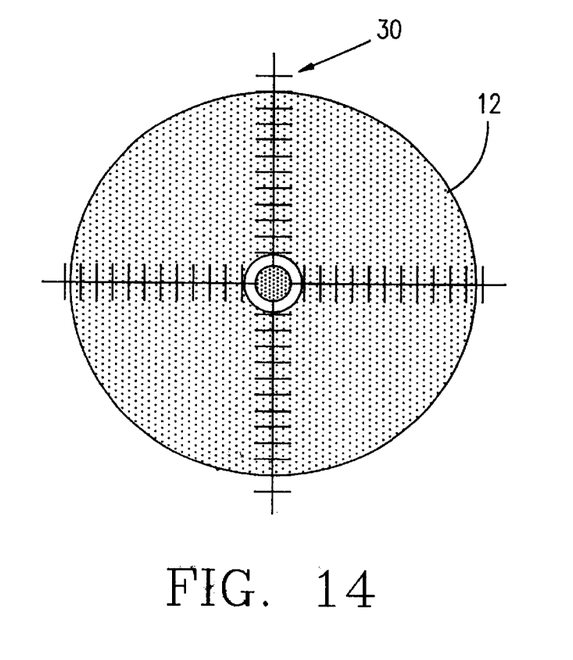
FIG. 14 is plan view of a reconstructed reticle projected on an eyepiece aperture of a hologram plate, wherein the reticle is substantially aligned.

Referring to FIG. 12, the laser collimator 10 is located in an operative environment. The telescope includes an optical cylinder 11 having a primary mirror 24, a secondary mirror 22 and an eyepiece holder 28. The eye piece holders are preferably 0.965 inches, 1.25 inches or 2 inches in diameter. For purposes of clarity, the eyepiece of the telescope is omitted from FIG. 11. The secondary mirror 22 and the primary mirror 24 may be adjusted by one or more adjusters 26. It is understood the configuration of the telescope is illustrative and the present invention may be practiced with any of a variety of optical elements.

For descriptive purposes it is convenient to refer to an eyepiece axis 70, along which the eyepiece holder 28 of the telescope is aligned, and an axis of origin 72, along which the laser beam and reticle image 30 are initially propagated before any optical deflection occurs. In some embodiments the axis of origin 72 coincides with the eyepiece axis 70, while in other configurations, the two axes intersect such as being perpendicular.

Figure 17:
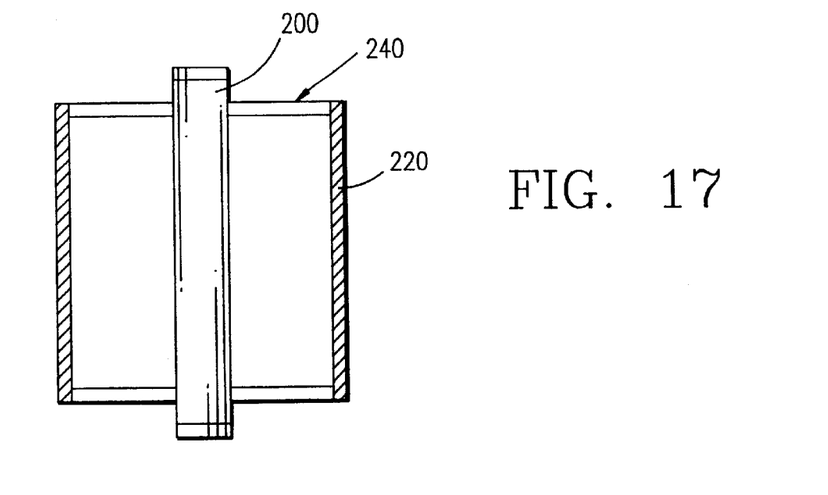
FIG. 17 is a side elevational view of a reticle image generator.
Figure 18:
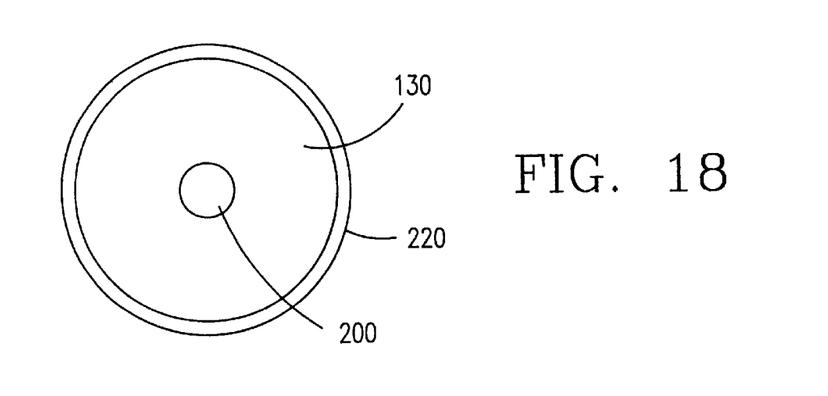
FIG. 18 is a top plan view of the generator of FIG. 17.
Figure 19:
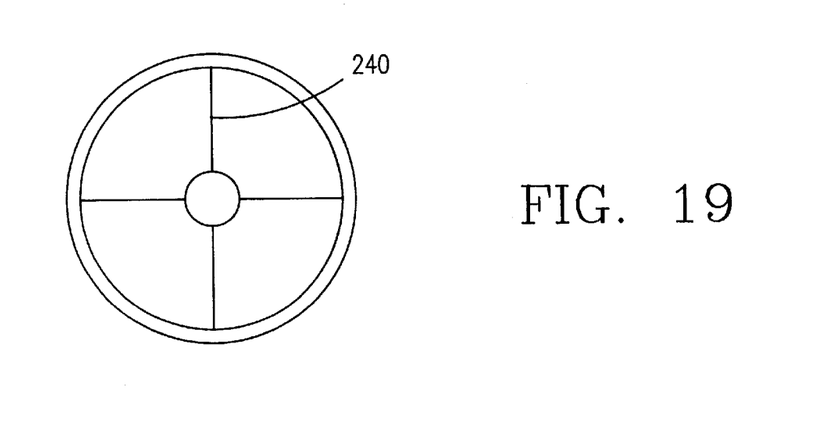
FIG. 19 is a top plan view of an alternative construction of the reticle image generator.

Referring to FIG. 17, the reticle image generator 200 includes the laser generator 52 and the diffractive optic 12. In addition, the reticle image generator may include the control 19 and indicator 18. The reticle image generator 200 also includes an outer housing 220 to operably locate the laser generator 52 and the diffractive optic 12. In certain applications the outer housing 220 is generally cylindrical and sized to be received within a telescope eyepiece. The reticle image generator 200 is retained within the outer housing 220 by mounts 240. The mounts 240 may be in the form of arms or struts. It is also contemplated the mounts 240 may be in the form of a lens or even a display screen 130.

In a preferred configuration, the reticle image generator 200 has a diameter sufficiently less than the diameter of the housing 220 so that a sufficient portion of a reflected reticle image can pass through the annulus between the reticle image generator 200 and the outer housing 220.

In one configuration, the reticle image generator 200 is located wholly or partially within the eyepiece barrel. The reticle image generator 200 includes the laser generator 52 and the diffractive optic 12. The reticle image generator 10 may be concentrically located within a tube, sleeve or barrel housing 220 for operable connection and alignment with the optics to be aligned. For some of the preferred configurations, the reticle image generator 200 is sized to permit the passage of a reflected reticle image between the generator 200 and an adjacent portion of the relevant housing 220 or structure that contains the optics to be aligned.

Figure 20:
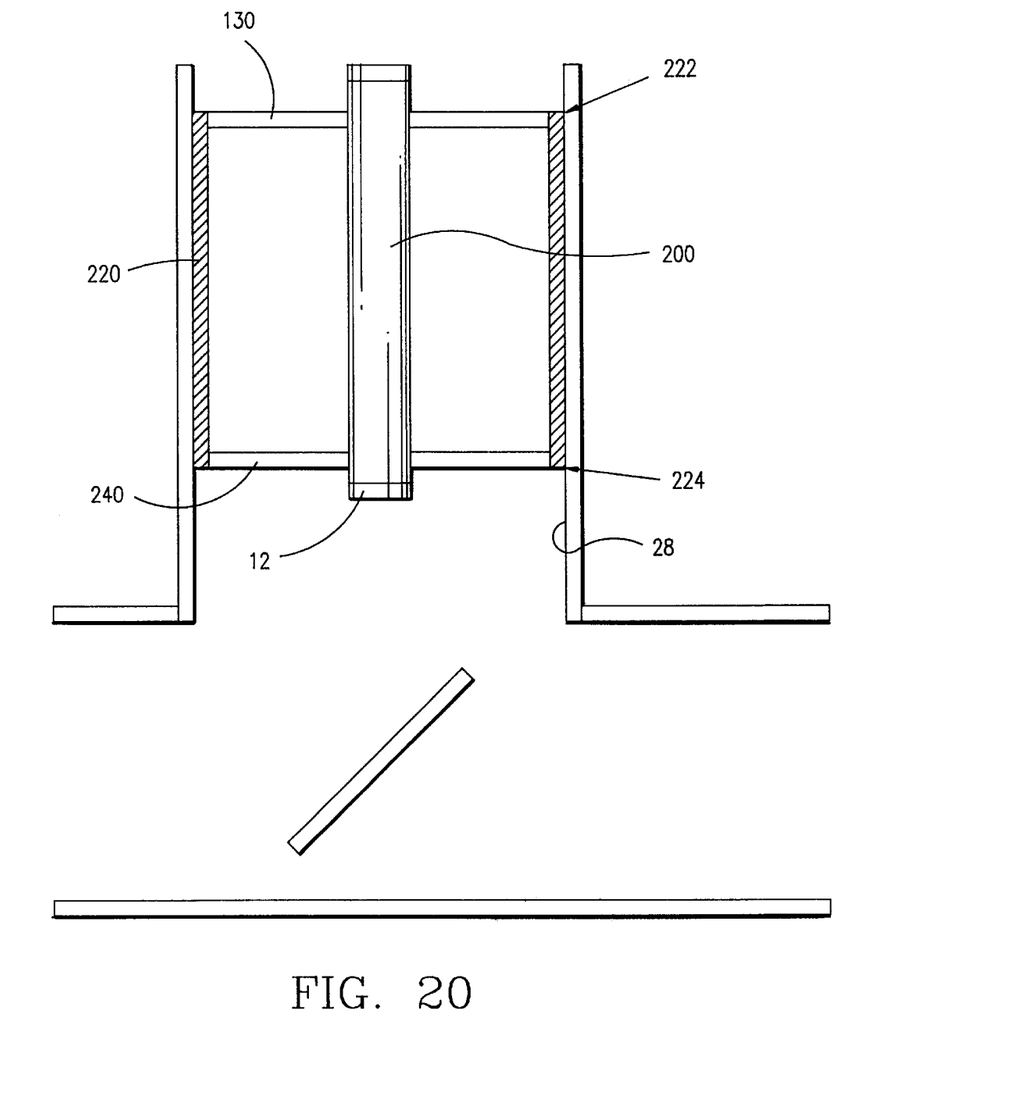
FIG. 20 is a side elevational view of a reticle image generator located in a telescope eyepiece optically intermediate a display screen and the optics to be aligned.
Figure 21:
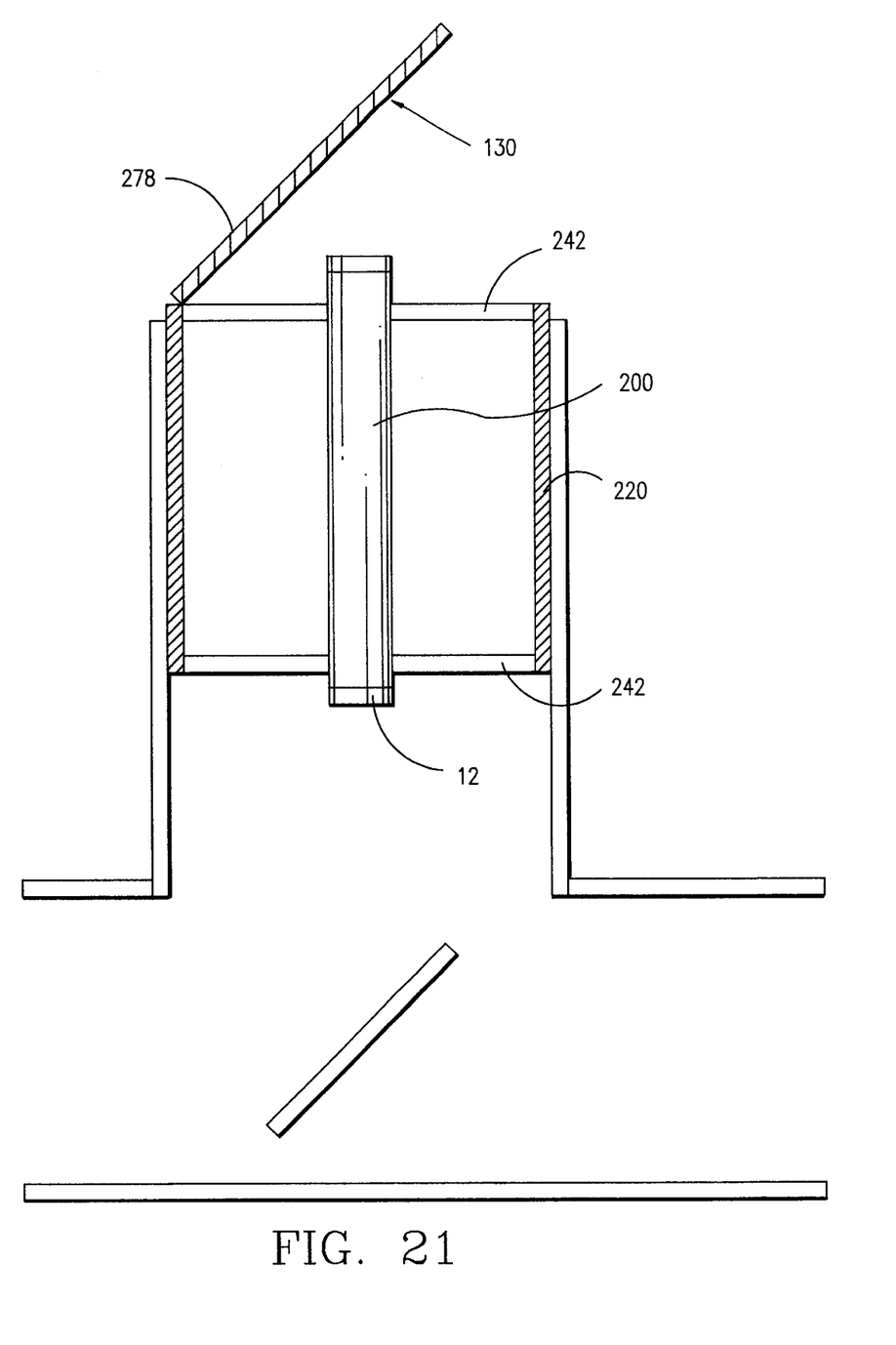
FIG. 21 is a side elevational view of an alternative construction having a reticle image generator located in a telescope eyepiece optically intermediate a display screen and the optics to be aligned.

Specifically, as shown in FIG. 20, the reticle image generator 200 is concentrically disposed within an eyepiece barrel 28 and the display 130.

The reticle image generator 200 has a proximal end 222 adjacent the operator and a distal end 224 spaced to the operator and proximal to the optics to be aligned.

In the embodiment of FIG. 20, the reticle image generator 200 includes a display screen 130 at the proximal end 222. The display screen 130 is a viewing surface upon which intersecting light is displayed. The display screen 130 may have any of a variety of configurations including but not limited to frosted plastics, glass or composites. The display (or viewing) screen 130 may also be a translucent member selected to pass a percentage of intersecting light energy.

The distal end 124 of the reticle image generator 10 may include a transparent lens 242. The transparent lens 242 may provide the mounting function of the mount 240. In some configurations the transparent lens 242 is an optional component. The transparent lens 242 made be formed of a variety of material including glass, composites plastic.

The reticle image generator 200 is located with respect to the optical elements to be aligned so as to project at least a portion of the reticle image 30 onto the optical elements, so that a reflected reticle image is formed. That is, a reflection of the reticle image from the optical element is created. The display screen 130 is located to intersect the reflected reticle image.

The reticle image 30 is projected onto the screen 130, to become readily visible to the operator. Upon viewing the reflected reticle image on the display screen 130, the operator can determine the alignment of the optical elements. To bring the optics into alignment, the adjusters 26 are used to position the optics until the reticle image 30 is centered with respect to the common axis or indicia on the display 130.

In some cases, it may not be possible for an operator to be positioned along the axis of the eyepiece. As in FIG. 21, an alternative embodiment employs a mirror 278 which is adjustably angled to reflect the reflected reticle image from the screen 130 towards the operator. In this construction, the mounts 240 may be struts or transparent lens 242.

Figure 22:
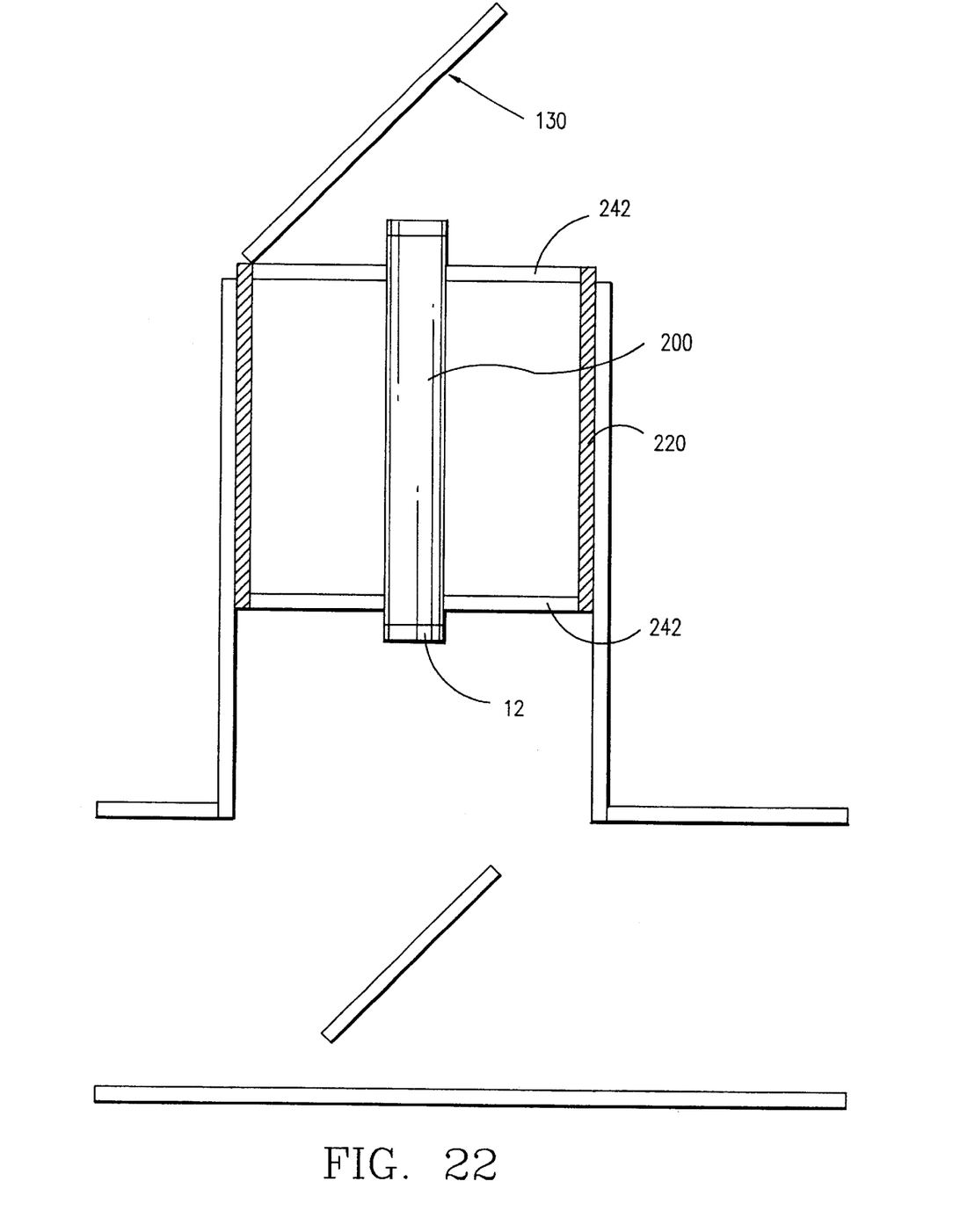
FIG. 22 is a side elevational view of a further construction having a reticle image generator located in a telescope eyepiece and an alternative display screen.

In a further configuration as in FIG. 22, both ends 222 and 224 include a transparent window or lens, and the viewing surface 130 a transparent diffracting member adjustably angled with respect to the reticle image generator 200 to be normal to a preferred line of sight of the operator 80.

It is also contemplated that the reticle image generator 200 may extend beyond the distal end 224. The distal end 224 includes the display screen 130. The proximal end 222 includes a transparent member 242 through which the display screen 130 is viewed.

Figure 23:
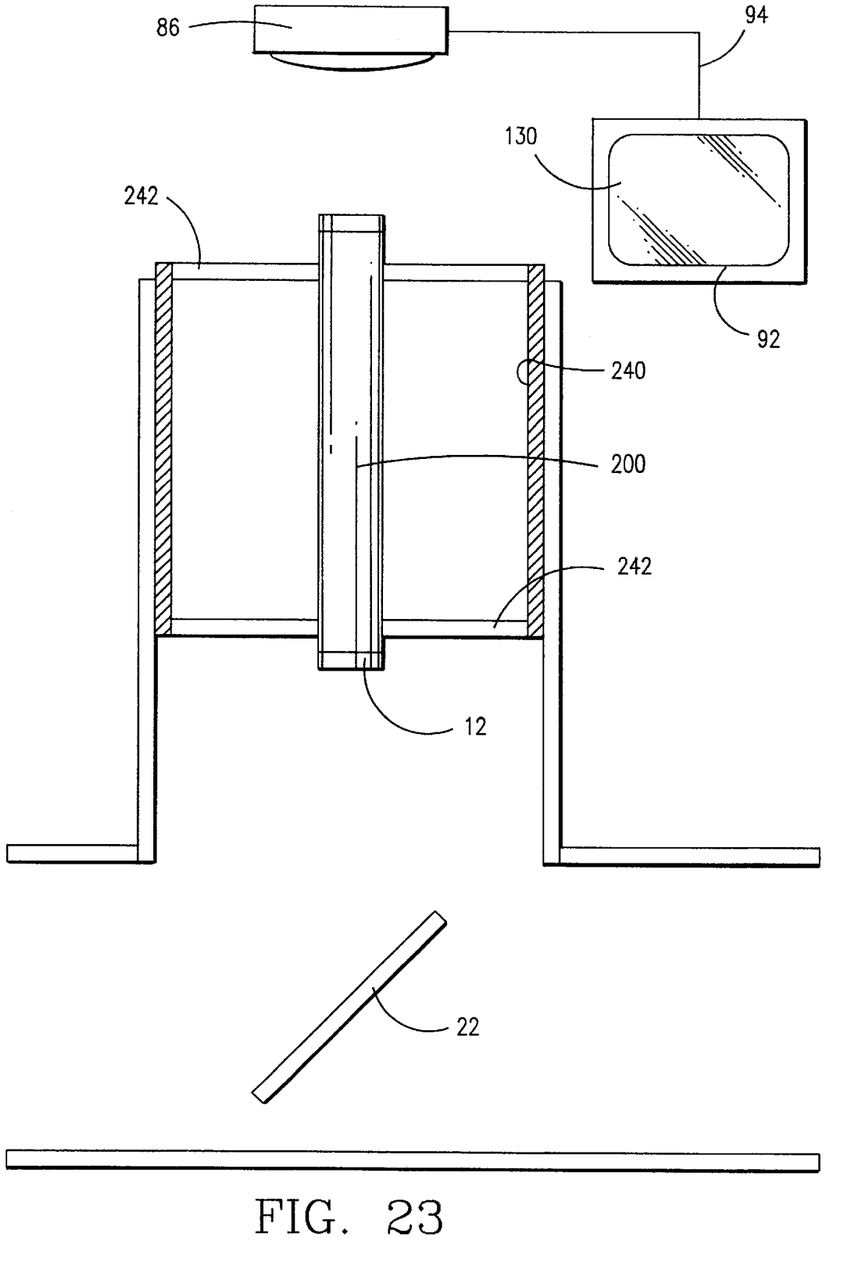
FIG. 23 is a side elevational view of another construction having a reticle image generator located in a telescope eyepiece and an electrically generated display.

Yet another embodiment, shown in FIG. 23, is constructed similarly to the previous embodiment, with the addition of a camera 86, positioned so that the reflected reticle image is captured by the camera. The camera may be a video camera, a still camera as well as digital. The captured image is viewed on a video display monitor 92 after being transmitted thereto through an interconnecting line 94. It is also understood the monitor 92 may be remotely located, thereby permitting remote alignment of the optical elements.

Figure 24:
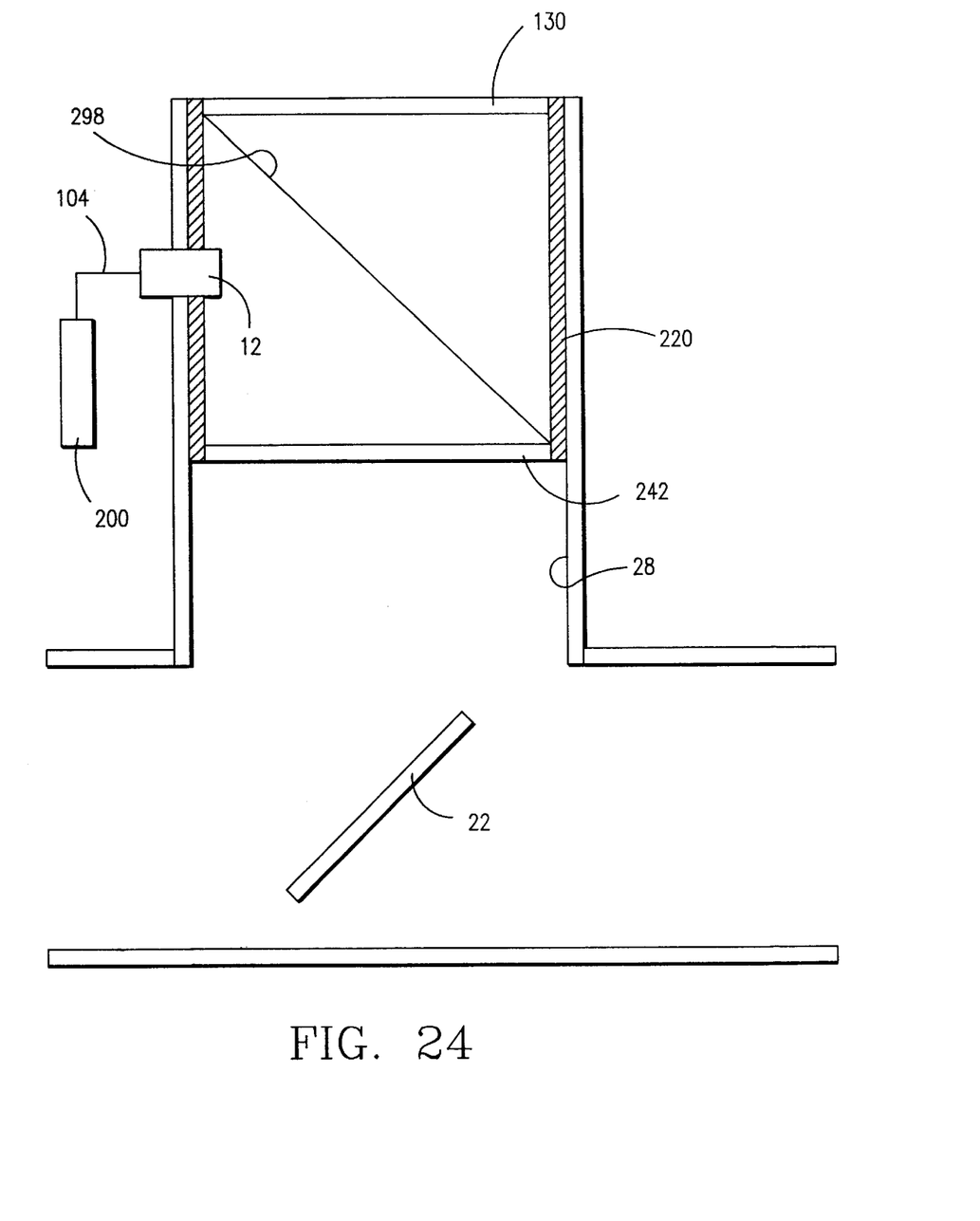
FIG. 24 is a side elevational view of a construction having a reticle image generator spaced from a telescope eyepiece.

As shown in FIG. 24, the reticle image generator 200 may be remote from the optical instrument and the generated reticle image is transmitted to the optical instrument. In these embodiments, the housing 240 includes a beam splitter 298, which intersects the path of the reticle image 30. The reticle image 30 is then reflected by the beam splitter 298 to travel along the eyepiece axis to intersect and be reflected from the optical elements. When the reflected reticle image arrives back at the beam splitter 98, it is partially transmitted to a display screen 130.

The reticle image generator 200 may be remote from the housing 220, which is modified to accept instead a fiber optic 104 which is coupled to the laser generator 52, as is shown for example in FIG. 24. The laser beam is transmitted along the fiber optic 104 to the diffractive optic 12. It is understood that any of the optical arrangements shown in FIGS. 20, 21, 22, 23, and 24 can equally well be adapted for use either directly with the laser generator, or with a remote laser generator coupled with the diffractive optic 12 by the fiber optic 104.

Method of Operation

To employ the present invention in the alignment of optical elements in a telescope, the telescope eyepiece is removed from the eye piece holder 28. The reticle image generator 10 is mounted in the eye piece holder 28 instead of the eye piece so as to locate the outer housing 220 within the eye piece holder.

In the alignment of the primary mirror and the secondary mirror in a Newtonian telescope, the reticle image generator 200 is then turned on. The laser passes through the hologram plate 12 and recreates the reticle image 30. Generally, the reticle image 30 is projected onto the secondary mirror 22. The reticle image reflects from the secondary mirror 22 and intersects the primary mirror 24. The reticle image 30 is reflected from the primary mirror and then intersects the display screen 130.

The secondary mirror 22 is adjusted until the reticle pattern image 30 is centered on the screen 130. The mount(s) connected to the secondary mirror 22 are used to position the reticle image as centered on the mirror 22. The centered status of the reticle image 30 is determined by aligning the gradations 35 with the periphery of the primary mirror 24. The inner circle 36 and outer circle 38 (if employed) may be used to assist centering the reticle image upon the primary mirror.

Once centered on the primary mirror 24, the reticle image 30 is reflected back by the primary mirror to the secondary mirror 22 and toward the reticle image generator 200. The reflected reticle image intersects and is viewable on the display 130. The mount for the primary mirror 24 is then adjusted using adjusters 26 to orient the reflected reticle image 30 on the display 130. The necessary adjustment to the primary mirror is accomplished by using its adjustment screws 26 to dispose the reflected reticle image 30 reflected from the primary mirror 24 to the secondary mirror 22 and onto the display 130.

Figure 15:
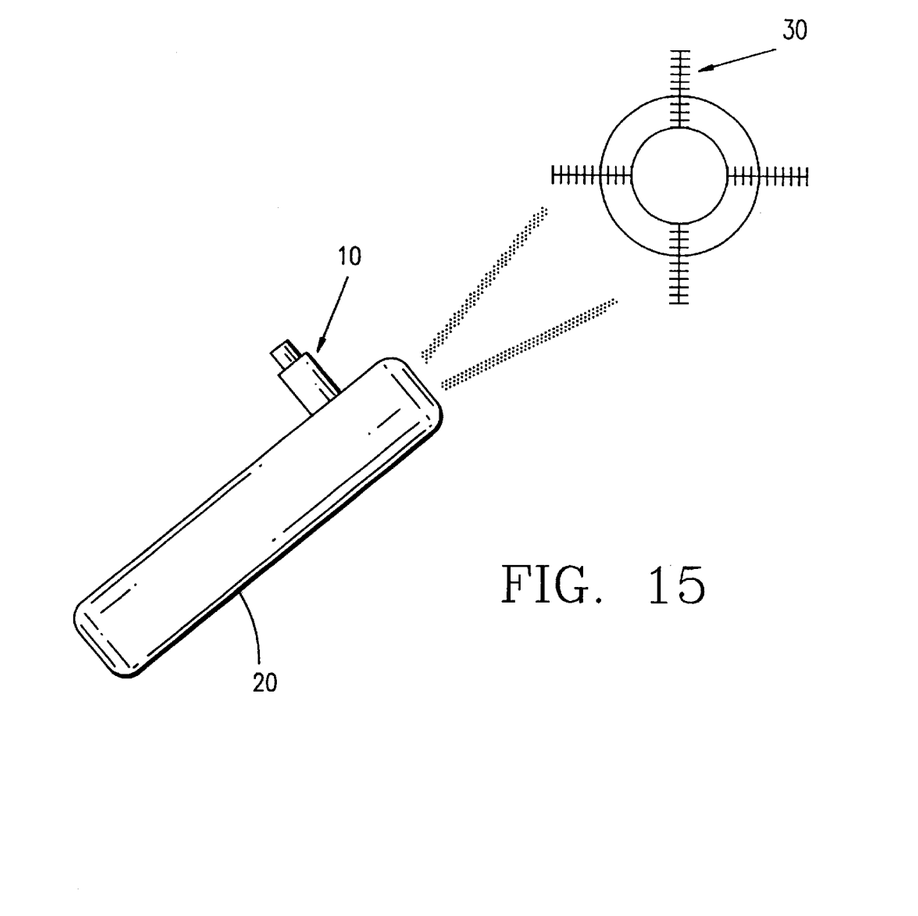
FIG. 15 is a schematic view of the projection of the reticle image to center a secondary mirror by blocking a portion of the projected image.

Further, the centration of the secondary mirror 22 in the telescope aperture may be confirmed by passing the reflected reticle image from the primary mirror out of the telescope, as shown in FIG. 15. That is, the diverging diffractive reticle image 30 is reflected back by the primary mirror 24 and is used to confirm centration of the secondary mirror in the telescope aperture. The secondary mirror blocks a corresponding portion of the image reflected from the primary mirror as the image passes from the telescope. By properly locating the portion of the reticle that passes the secondary mirror with respect to the portion of the reticle that is blocked by the secondary mirror, the centration of the secondary mirror is confirmed.

Although the process has been described in terms of employing a centered reticle image, it is understood the projected reticle may be offset from a given optic element, where the amount of degree of offset is used in the alignment process.

Further, while the description has been generally in terms of a telescope, it is also understood the present invention may be employed to align optical elements in any imaging system having a plurality of optical elements. For example, the present invention may be employed with lithography including semiconductor lithography, photographic systems, microscopes, fiber optics and multi-element optical systems as well as telescopes.

While prior techniques may align the primary mirror, the secondary mirror may still not be centered on the optical path. A non centered secondary mirror (relative to the tube and the axis of the primary mirror) causes asymmetrical diffraction patterns and an increase in off axis aberrations. In the present invention, the reflection of the diverging diffractive reticle image 30 out of the telescope 20 from the primary mirror 24 is used to confirm centration of the secondary mirror 22 in the telescope aperture.

The reticle image 30 also allows inspection of the mirror coatings for defects as well as illumination of any obstructions in the optical path. That is, the gradations and inner circle may be used to identify variations in mirror coatings.

Figure 16:
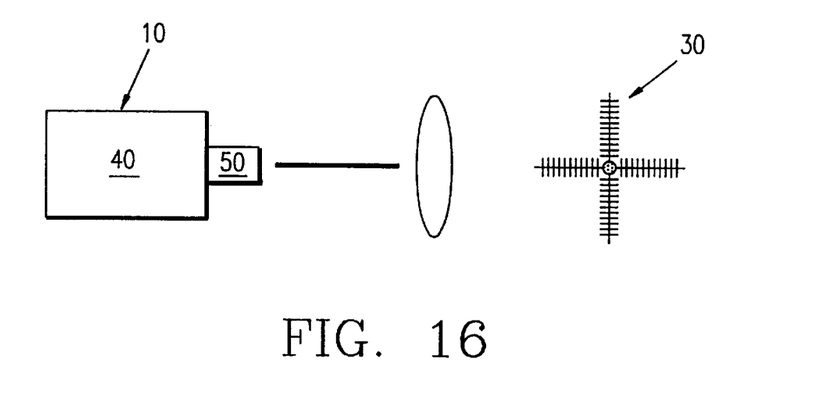
FIG. 16 is a side elevational view of the projected reticle image in aligning a refracting type telescope.

The laser projected reticle 30 will align all Newtonian telescopes as fast as f/3.5 and even those incapable of alignment with old style laser based collimators, such as Cassegrain-Newtonian telescopes with cored primaries or Newtonians with primary mirrors that have been marked with black spots in their center for Cheshire collimation techniques. Further, the present invention may be used to align refracting telescopes, whose optics are schematically shown in FIG. 16.

The above description is illustrative and not restrictive. Many variations of the invention will become apparent to those of skill in the art upon review of this disclosure. The scope of the invention should, therefore, be determined not with reference to the above description, but instead should be determined with reference to the appended claims along with their full scope of equivalents.

What is claimed is:

1. A method of aligning an optical element, comprising:
   (a) projecting a laser reconstructed holographic reticle image onto the optical element to form a reflected reticle image;
   (b) reflecting the projected reticle image from the optical element;
   (c) displaying the reflected reticle image upon a display; and
   (d) aligning the optical element in response to the reflected reticle image on the display.

2. The method of claim 1, further redirecting the reflected reticle image with a mirror optically intermediate the display screen and an operator.

3. The method of claim 2, wherein displaying the reflected reticle image upon a display includes displaying the reflected reticle image on an electronic display.

4. The method of claim 1, further comprising passing the projected reticle image through a beam splitter.

5. An apparatus for aligning an optical element, comprising:
   (a) a reticle image generator including a laser and a reticle forming optic selected to project a laser reconstructed reticle image on the optical element to form a reflected reticle image; and
   (b) a display screen located to view the reflected projected reticle image.

6. The apparatus of claim 5, wherein the reticle image generator is sized to be located within an eyepiece barrel of a telescope.

7. The apparatus of claim 5, wherein the display screen is electrically driven.

8. The apparatus of claim 5, further comprising a beam splitter optically intermediate the reticle image generator and the display screen.

9. An apparatus for aligning an optical element, comprising:
   (a) a housing operably aligned with the optical element;
   (b) a fiber optic located in the housing;
   (c) a diffractive holographic optic connected to the housing to form an image reconstructible by a laser beam passing through the fiber optic; and
   (d) a viewing surface located to intersect a reflected image.

10. A method of aligning an optical element in a telescope having an eyepiece holder disposed along an eyepiece axis, the method comprising:
    (a) projecting a holographic laser reconstructed reticle image along the eyepiece axis and onto the optical element;
    (b) reflecting the reticle image from the optical element to be aligned so that the reflected reticle image is received at a viewing surface; and
    (c) aligning the optical element in response to the reflected reticle image.

* * * * *